H. AMIOT.
SELF PROPELLED PLOW.
APPLICATION FILED JULY 21, 1914.
1,191,143.
Patented July 18, 1916.
2 SHEETS—SHEET 1.
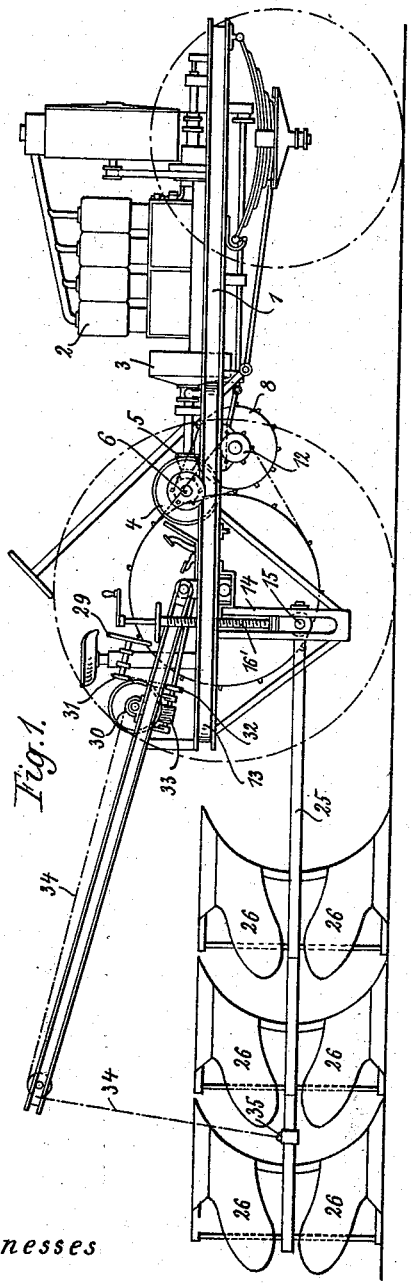
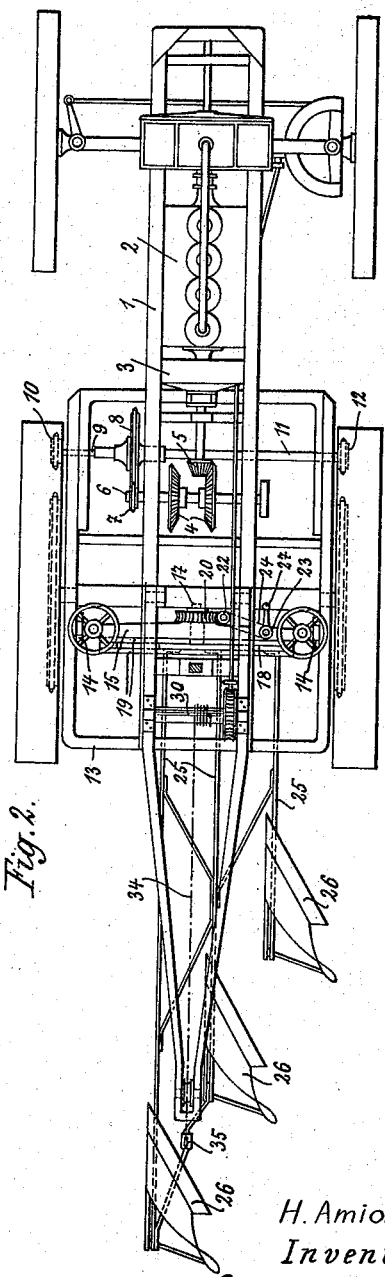
Witnesses
H. Amiot.
Inventor
By *[signature]*
Attorney.

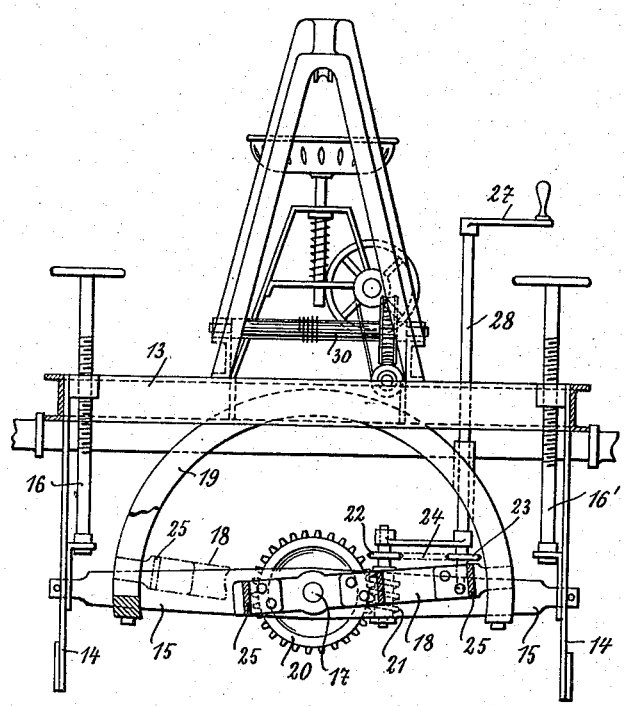

UNITED STATES PATENT OFFICE.

HENRI AMIOT, OF RHEIMS, FRANCE.

SELF-PROPELLED PLOW.

1,191,143.  Specification of Letters Patent. Patented July 18, 1916.

Application filed July 21, 1914. Serial No. 852,219.

*To all whom it may concern:*

Be it known that I, HENRI AMIOT, a citizen of the French Republic, and residing at 50 Rue Lesage, Rheims, Marne, France, have invented certain new and useful Improvements in Self-Propelled Plows, of which the following is a specification.

This invention relates to self-propelled plows which according to the present invention are provided with a device permitting the elements of the plow to be turned over at the end of the furrow as in the case of a double axle-tree hoop, and of effecting the reciprocating work, the strips of earth being always thrown on to one and the same side. With such an arrangement all parts of the ground are properly worked and no losses occur as is the case with self-propelled plows with single plowing elements; further, much time is saved by dispensing entirely with tacking, since after one furrow has been made the next one can be started immediately at the side of the one previously made.

Referring to the accompanying drawings which illustrate by way of example one mode of carrying out the invention, Figure 1 is an elevation, Fig. 2 a plan view, and Fig. 3 a rear view of one arrangement.

1 is a frame which is made narrow at the front end and carries the motor 2 and coupling 3, the latter transmitting the movement of the motor to a reversing gear 4 through the intermediary of a conical pinion 5. The shaft 6 of the reversing gear is provided with a chain wheel 7 which transmits its movement to a chain wheel 8. The latter may positively be connected by means of a suitable fork either to a shaft 9 carrying a chain wheel 10 which is keyed thereto, or to a shaft 11 carrying a chain wheel 12 or to both shafts at the same time, so as to turn either only one driving wheel or the two together. A second frame 13, larger than the frame 1, is mounted at the back of the latter, and two guide bars 14 are secured thereto. A cross bar 15 is arranged to slide in the guides 14 under the influence of controlling screws 16 and 16¹ and a pivot 17 is provided in the axis of the cross bar 15, to which pivot is keyed a member 18. The member 18 slides at one of its ends in an arc shaped guide 19. A worm wheel 20 engaging with a worm 21 is keyed to the other end of the pivot 17, the worm 21 being driven by the chain wheels 22, 23 and chain 24.

It will easily be understood since the member 18 is fixed to the frame 25 constituting the plow-beam and carrying the double plowing elements, that when the handle 27, which is mounted on to the other end of the shaft 28 on to which the chain wheel 23 is keyed, is turned by hand or by means of a motor, the member 18 with its frame 25 will be turned around the pivot 17 thereby causing the turning over of the plowing elements. The end of the beam 25 can pivot around the ends of the cross bar 15 so that when the hand wheel 29 is operated, the cylinder 30 will be rotated through the intermediary of the chain wheels 31 and 32 and worm 33, and the cable 34, the end 35 of which is connected to the beam 25, be wound around said cylinder thereby causing the beam 25 to be raised.

Having now described my invention, what I claim as new and desire to secure by Letters Patent is:—

1. A self-propelled plow comprising in combination a carriage frame, a cross bar attached thereto, a rotary pivot mounted on said cross bar, means for turning the pivot in both directions, a frame serving as a plow-beam, double plowing elements mounted on said plow-beam and a bar to which the plow-beam is secured and which is mounted on the rotary pivot, as and for the purpose set forth.

2. A self-propelled plow comprising in combination a carriage frame, a cross bar attached thereto, a rotary pivot mounted on said cross bar, means for turning the pivot in both directions, a frame serving as a plow-beam, double plowing elements mounted on said plow-beam, a bar to which the plow-beam is secured and which is mounted on the rotary pivot, and an arc shaped guide for guiding the bar to which the plow-beam is secured, as and for the purpose set forth.

3. A self-propelled plow comprising in combination a carriage frame, a cross bar attached thereto, a rotary pivot mounted on said cross bar, means for turning the pivot in both directions consisting of a worm wheel arranged at the front end of the rotary pivot, a worm engaging with the worm wheel, a chain and chain wheels and an operating handle, a frame serving as a plow-beam, double plowing elements mounted on said plow-beam and a bar to which the plow-beam is secured and which is mounted on the rear of the rotary pivot, as and for the purpose set forth.

In testimony whereof I have signed my name to this specification in the presence of two subscribing witnesses.

HENRI AMIOT.

Witnesses:
H. BARDEL,
S. BARDEL.

Copies of this patent may be obtained for five cents each, by addressing the "Commissioner of Patents, Washington, D. C."